United States Patent [19]
Saderholm

[11] Patent Number: 5,749,597
[45] Date of Patent: May 12, 1998

[54] INTEGRAL COVER-DEPLOYMENT CHUTE FOR SIDE AIRBAG MODULE

[76] Inventor: Davin G. Saderholm, Wolfsweg 42, 74321 Bietigheim-Bissingen, Germany

[21] Appl. No.: 812,436

[22] Filed: Mar. 7, 1997

[51] Int. Cl.$^6$ .................................................. B60R 21/20
[52] U.S. Cl. .................................. 280/728.2; 280/730.2
[58] Field of Search ........................ 280/730.2, 728.2, 280/743.1, 728.3, 730.1

[56] References Cited

U.S. PATENT DOCUMENTS

| | | | |
|---|---|---|---|
| 3,778,085 | 12/1973 | Lipkin | 280/150 AB |
| 5,013,065 | 5/1991 | Kreuzer | 280/743 |
| 5,112,079 | 5/1992 | Haland et al. | 280/730 |
| 5,342,088 | 8/1994 | Bauer | 280/728 B |
| 5,348,342 | 9/1994 | Haland et al. | 280/730 A |
| 5,354,095 | 10/1994 | Muller et al. | 280/728 B |
| 5,398,958 | 3/1995 | Taggart | 280/728 A |
| 5,431,435 | 7/1995 | Wilson | 280/728.3 |
| 5,498,030 | 3/1996 | Hill et al. | 280/743.1 |
| 5,553,887 | 9/1996 | Karlow et al. | 280/730.2 |
| 5,630,615 | 5/1997 | Miesik | 280/730.2 |
| 5,639,111 | 6/1997 | Spencer et al. | 280/728.2 |
| 5,645,295 | 7/1997 | White, Jr. et al. | 280/730.2 |

FOREIGN PATENT DOCUMENTS

| | | |
|---|---|---|
| 4-050052 | 2/1992 | Japan. |
| 4-358943 | 12/1992 | Japan. |
| 6-227350 | 8/1994 | Japan. |

OTHER PUBLICATIONS

Research Disclosure No. 373, May 1995, pp. 315–319.

*Primary Examiner*—Christopher P. Ellis

[57] ABSTRACT

A flexible sheet of material forms an integral airbag module housing enclosing an inflator and inflatable airbag, which cover also acts as a deployment chute guiding the deployment of the inflating airbag to the desired deployment location in a motor vehicle.

12 Claims, 2 Drawing Sheets

5,749,597

1

INTEGRAL COVER-DEPLOYMENT CHUTE FOR SIDE AIRBAG MODULE

FIELD OF THE INVENTION

This invention relates to an integral cover-deployment chute for a side airbag module for attachment to an internal structural member of a seat.

BACKGROUND OF THE INVENTION

Side impact airbag modules have been provided in vehicles for protecting vehicle occupants in the event of a side oriented collision. Such side impact airbag modules have been installed in a variety of locations in the vehicle, including, for example, in the door, roof, A or B-pillars and also in the seats of the vehicle. When placed in seats of vehicles, such side airbag modules are generally anchored or secured to an internal structural member of the seat. Such seat mounted side airbag modules generally include a rigid plastic or an extruded or drawn or cast metal container-type housing which houses an inflator and an inflatable folded airbag cushion.

Typically, such rigid housing will have some type of deployment door which bursts open to permit deployment of the airbag out from the seat. While the airbag module is generally placed in a recess in the seat back, usually in a recess in the foam cushion portion of the seat back, the module cannot be located too close to the outer trim cover of the seat due to the hardness and rigidity of both the housing and its associated door since these can undesirably alter the smooth contour of the outer trim cover of the seat and also can produce hard or stiff areas that can cause discomfort to the seat occupant. However, when the airbag module is located in the recess in a location remote from the outer trim cover of the seat, deployment of the airbag through the desired deployment opening in the seat becomes problematic and unpredictable.

It is therefore an object of this invention to provide an integral housing or cover for a side airbag module that also acts as a deployment chute to consistently guide and direct the inflating airbag to the desired deployment location in the seat outer trim cover along a predetermined deployment path. A further object of this invention is to provide such a housing or cover for a seat mounted airbag module that is a unitary, single component cover that is easy to produce and is lightweight and is soft and flexible so as not to produce stiff points in the outer trim cover of the seat.

SUMMARY OF THE INVENTION

This invention provides an airbag module including an inflator for generating inflation gas and a folded, inflatable airbag connected to the inflator for receiving inflating gas from the inflator when deployment of the airbag is desired. The airbag module further includes a module cover or pouch that serves as both a cover or housing of the airbag module and as a deployment chute or director for the inflating airbag.

The module cover can be made of either fabric or a thin flexible plastic sheet. The module cover has wall portions surrounding or encircling the folded airbag and the inflator. These wall portions define a cover interior containing the inflator and the folded airbag. Ends of said wall portions are brought together to define a frangible seam which is rupturable to open into or form a deployment chute opening for guiding and directing the inflating airbag out of the cover housing to the desired deployment exit or opening in the seat outer trim cover.

2

BRIEF DESCRIPTION OF THE DRAWINGS

The invention is illustrated by way of the following exemplary embodiment in reference to the following drawings in which.

DETAILED DESCRIPTION OF THE INVENTION

Figure 1:
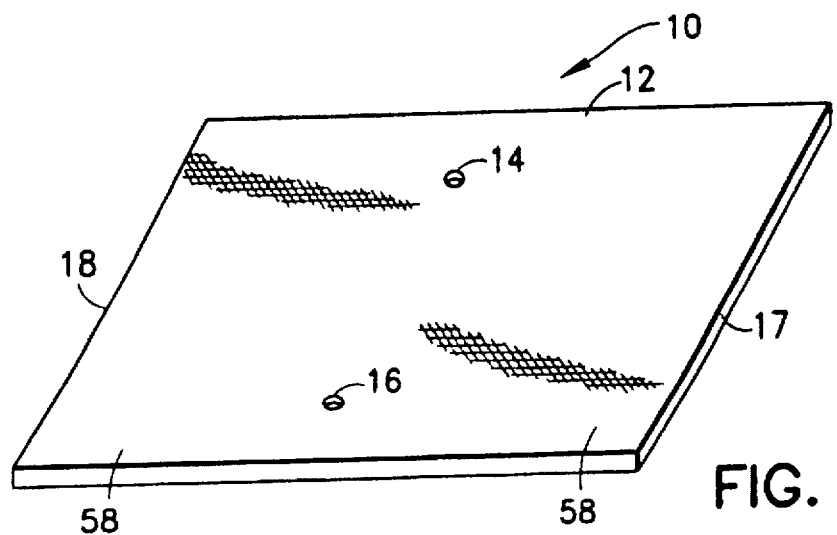
FIG. 1 is a perspective view of a sheet of material employed to form a housing cover or pouch for an airbag module of the invention.

Referring to FIG. 1, there is shown a sheet of material, for forming a module housing cover 10 or pouch of this invention, prior to employing it to enclose an airbag module. The housing cover or pouch 10 is a flexible sheet 12 of material, which may be either fabric or a flexible plastic material, such as a thin, extruded sheet of thermoplastic polyolefin. The sheet of material 12 comprising the cover 10 is provided with mounting apertures 14, 16, for a purpose discussed hereinafter, intermediate opposite edges 17, 18 of the sheet. The sheet material 12 comprises wall portions 58 between the apertures 14, 16 and the opposing edges 17, 18.

Figure 2:
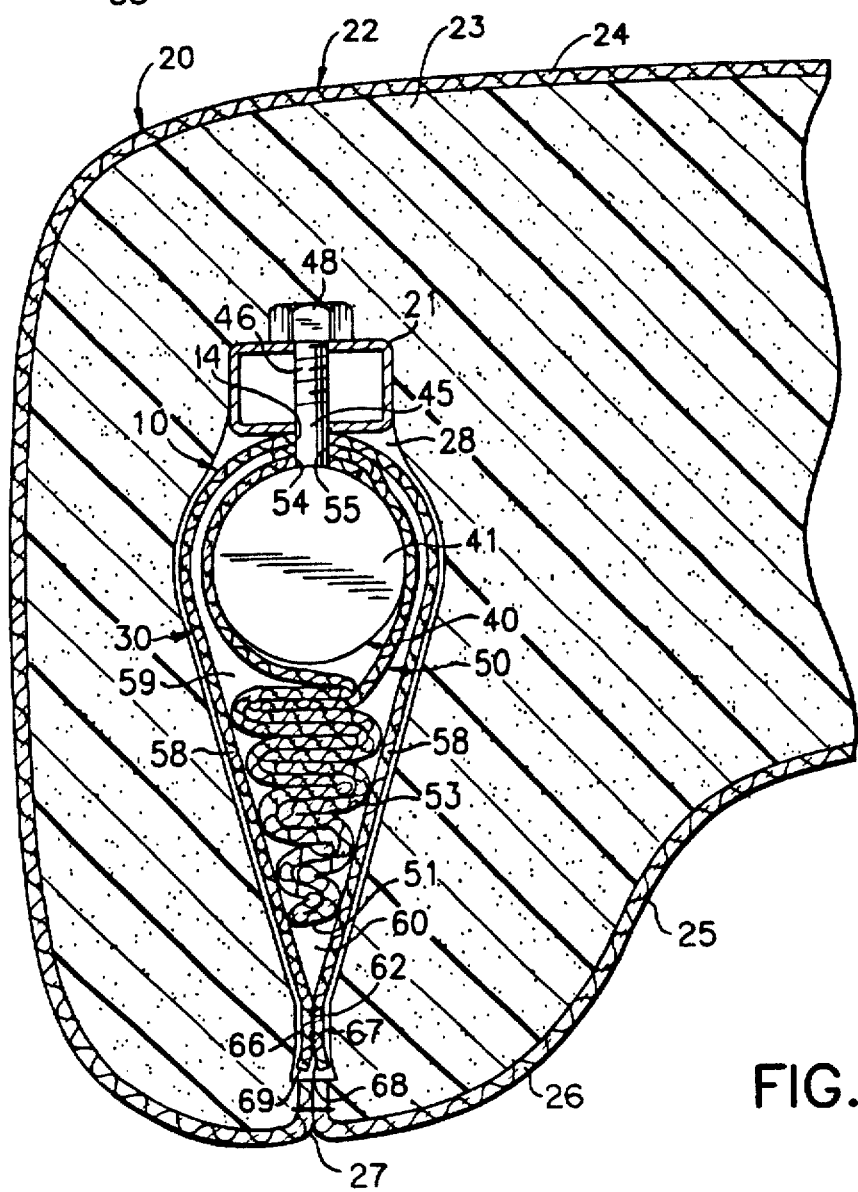
FIG. 2 is a sectional view of an embodiment of the airbag module with a housing of this invention located in the seat of a vehicle, the airbag being in an undeployed state.
Figure 3:
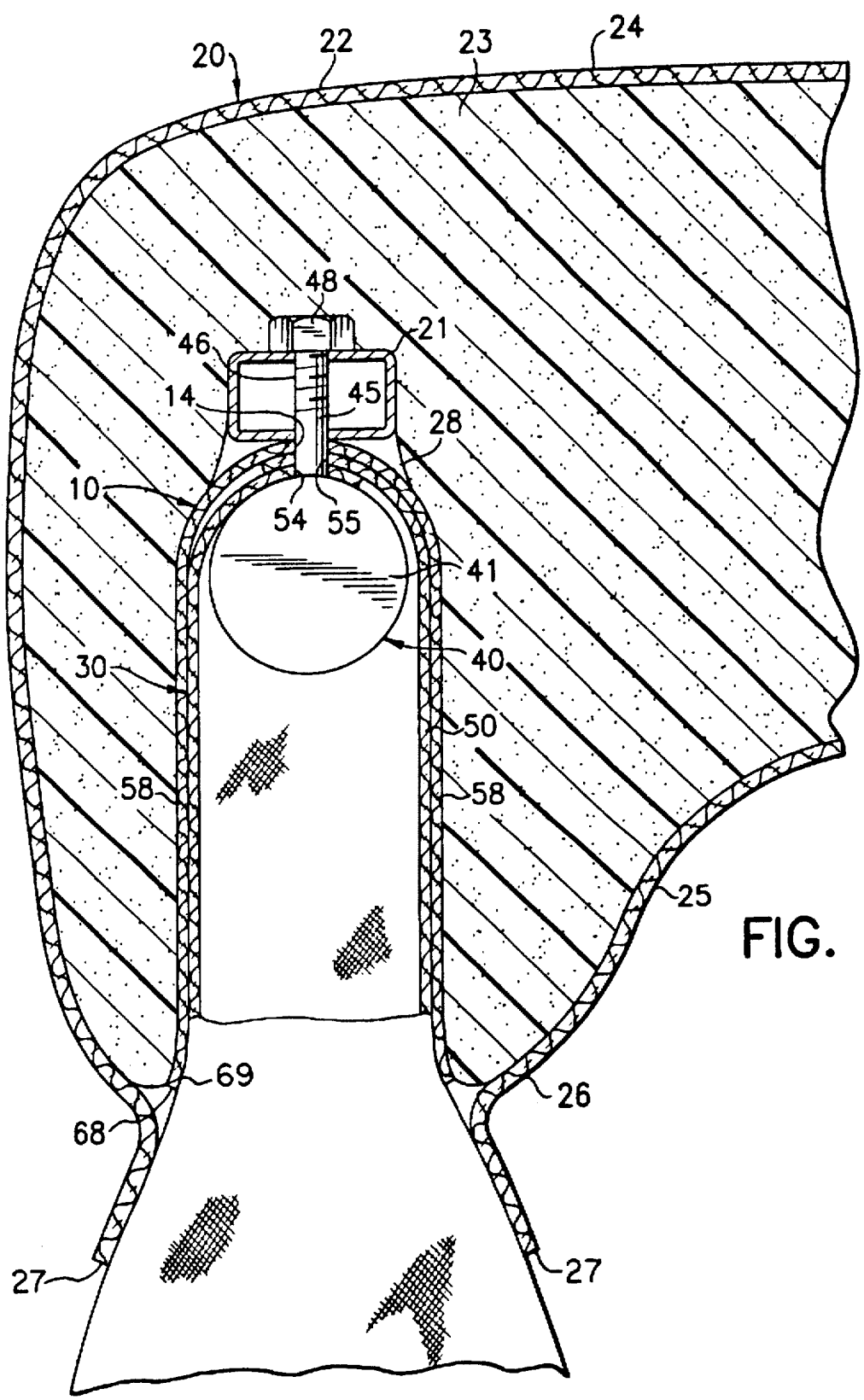
FIG. 3 is a view similar to FIG. 2 but showing the airbag of the airbag module in its deployed state.

Although the cover 10 is suitable for housing an airbag module in various locations in a motor vehicle, it is illustrated in FIGS. 2 and 3 as a housing for a side airbag module 30.

The upper seat back portion 20 of the seat 19 includes an internal structural member, such as a rigid seat frame rail 21, preferably being metal, and encompassed within a cushion portion 22 of the seat back 20. The cushion portion 22 is preferably formed of a foam material 23 covered by fabric seat material 24 defining the contour of the outer surface 25 of the seat back 20. A front 26 of the outer surface 25 of the seat back 20 includes a vertically extending frangible seat seam 27 proximate the inner door panel of a vehicle door (not shown). A recess 28 is provided in the foam material 23 for receiving an airbag module, generally designated by the reference numeral 30.

A complete airbag module 30 includes an inflator 40, an airbag 50 having a partially folded deployment portion 51 and a mouth portion 52, and mounting studs 45 (only one being shown) extending from the inflator 40 for mounting the entire module 30 to any suitable vehicle structure.

The inflator 40 may be of any conventional construction which contains chemicals for igniting to generate gas for discharge upon the existence of predetermined vehicle conditions. The inflator 40 is rigid and preferably has an axially elongated cylindrical body 41 including ports (not shown) through which the inflator gas discharges to inflate the airbag 50.

The elongated mounting studs 45 are secured to the body 41 of the inflator 40 and extend radially outwardly therefrom for attachment to any suitable vehicle structure, such as the seat frame rail 21. The mounting studs 45 preferably each have a threaded end 46 for receiving a nut 48 thereon, as shown.

The airbag 50 includes the partially folded deployment portion 51 which is inflatable upon the discharge of inflator gas. The deployment portion 51 includes folds 53 which are oriented forwardly on the module 30 for deployment in a forwardly direction. The mouth portion 52 of the airbag 50 has apertures 54, 55 for attaching the mouth around the inflator body 41 by placing the apertures over the studs 45 before the studs are mounted to the internal structural member 21.

The airbag module 30 also includes the housing cover or pouch 10 enclosing the airbag 50 and inflator 40. Mounting apertures 14, 16 of the housing cover 10 are placed over and around elongated mounting studs 45 which are attached to the seat structural member 21. The wall portions 58 of the sheet 12 cooperatively defines an insertion opening through which the airbag 50 and inflator 40 are insertable into the housing 10. The two side wall portions 58 are wrapped around the airbag 50 and inflator 40 with areas of the side walls adjacent the sheet edges 17, 18 being sealed together by means of a frangible seam 62. The frangible seam 62 could be any suitable seam that is rupturable upon deployment of the folded airbag 50, for example, a sewn seam, a heat sealed seam or the like. In the illustrated embodiment the housing 10 is shaped to form a tear drop or clam shell shaped housing or pouch. It will be appreciated that the flexible sheet 12 of the housing could be formed into any suitable shape depending upon the shape of the inflator 40 and the folded deployment portion 51 of the airbag 50. It will also be understood that the shape of the recess 28 in the seat cushion 22 will be shaped to be complementary to the shape of the housing or pouch 10.

The side wall portions 58 defining an enclosed pouch interior 59 including a frangible pouch seam 62 which closes a pouch deployment opening 60.

The side wall portions 58 form the enclosed pouch interior 59 which completely encloses, houses, and covers the inflator 40 and the mouth 52 and deployment portions 51 of the airbag 50. The side wall portions 58 are sized for closely surrounding the inflator 40 and the mouth and deployment portions 52, 51 of the airbag 50. The frangible pouch seam 62 is adjacent and overlying the folds 53 of the deployment portion 51 of the airbag 50 such that the frangible pouch seam 62 is breakable upon deployment of the airbag 50 to define the pouch deployment opening 60 through which the deployment portion 51 of the airbag 50 deploys, as shown in FIG. 3.

Referring to FIG. 3, the housing or pouch portion 10 preferably also includes an integral chute portion 66 extending forwardly beyond the frangible pouch seam 62 and having a closed end 67 adjacent the frangible pouch seam 62 and an opposite open free end 68. The free end 68 of the chute portion 66 defines a chute opening 69 as best shown in FIG. 3. The chute portion 66 guides the deployment portion 51 of the airbag 50 during deployment, as described below.

The entire module 30 is located completely within the cushion portion 22 of the seat back 20 and is mounted to the seat frame rail 21. Prior to deployment, the frangible pouch seam 62 of the deployment portion 51 is preferably aligned with the frangible seat seam 27 of the seat back 20. The frangible pouch seam 62 and the folds 53 of the deployment portion 51 are located proximate the outer surface 25 of the seat back 20 while the rigid inflator 40 is oriented away from the outer surface 25 of the seat 19. Thus, the module 30 only has soft fabric components facing the outer surface 25 of the seat 19 such that any stiff points caused by the rigid components such as the housing and cover normally found in prior art modules are eliminated. Advantageously, this enables the module 30 to be located closely beneath the outer surface 25 of the seat 19 while maintaining the comfort of the seat 19 for the occupant.

Assembly of the airbag module 30 and its mounting into the seat 19 is accomplished as follows. The apertures 54, 55 of the mouth portion 52 of the airbag 50 are placed over mounting studs 45 of the inflator 40 and the deployment portion 53 of the airbag is suitably folded. The apertures 14, 15 of the housing sheet 12 are also placed on the studs 45 over the airbag mouth portion 52. The wall portions 58 of the housing sheet 12 are then flexed and brought together at their edges 17, 18 enclosing the airbag 50 and inflator 40. Proximate the edges 17, 18 the wall portion 58 are rupturably sealed, such as by sewing or heat sealing or the like, to provide the frangible seam 62. The airbag module 30 can now be mounted in the seat 19 by inserting the module in recess 28, placing mounting studs 45 through the internal mounting member 21 and threading nuts 48 onto the threaded ends 46 of the studs. The front portion 26 of outer trim cover 25 of seat 19 can then be sewn to provide the frangible seat seam 27 and close up the seat trim cover.

Referring to FIG. 3, when inflator 40 is actuated upon a signal from a sensor (not shown), the inflator provides inflation gas to the airbag 50 to begin inflation of the deployment portion 51 of the airbag. The deployment portion 51 of the airbag inflates and folds 53 expand and rupture the frangible seam 62 of the housing 10 so that the airbag 50 deploys out through the deployment opening 60 of the housing 10 into the chute portion 66 and then out through chute opening 69 immediate adjacent frangible seam 27 of seat 19. The deploying airbag 50 causes the foam material to deform and thereby rupture frangible seam 27 permitting the airbag to deploy into the desired area of the vehicle for protection of a vehicle occupant.

It will be understood that the chute portion 66 of the housing 10 guides the deployment direction and location of the inflating airbag 50.

It will be understood that the foregoing description of embodiments of this invention are only for illustration of the invention and that those skilled in the art can make various modifications thereto without departing from the spirit and scope of the invention.

I claim:

1. An airbag module for attachment to a vehicle, the module comprising:

an inflator for generating gas;

an airbag coupled to the inflator and deployable upon generation of gas by the inflator;

a pouch made of fabric material, the pouch having wall portions surrounding the airbag and inflator, the wall portions defining a pouch interior containing the inflator and the airbag substantially therein such that the inflator and the airbag are housed within the pouch, the pouch including a frangible seam being breakable to define a pouch deployment opening; and the pouch including a fabric chute portion being a continuous extension of the fabric material of the pouch and extending beyond the frangible seam, the chute portion having a first end adjacent the frangible seam and an opposite free end;

whereby upon airbag deployment, the airbag breaks open the frangible seam of the pouch to permit deployment of the airbag out through the pouch deployment opening and the chute portion of the pouch such that the pouch guides the airbag during deployment.

2. The module of claim 1 wherein the fabric material forming the pouch is completely separate and independent from the airbag.

3. The module of claim 2 wherein the wall portions of the pouch cooperatively define an insertion opening through which the airbag and the inflator are insertable into the pouch, and wherein the pouch includes closure means for closing the insertion opening.

4. An airbag module for attachment to a vehicle, the module comprising:

an inflator for generating gas;

an airbag coupled to the inflator and deployable upon generation of gas by the inflator; and a housing for housing the airbag and inflator, the housing being the outermost portion of the airbag module, the housing consisting of a pouch made of flexible fabric material, the pouch having wall portions surrounding the airbag and inflator, the wall portions defining a pouch interior containing the inflator and the airbag substantially therein, the pouch including a frangible seam being breakable to define a pouch deployment opening; whereby upon airbag deployment, the airbag breaks open the frangible seam of the pouch to permit deployment of the airbag out through the pouch deployment opening such that the pouch guides the airbag during deployment.

5. An airbag module for attachment to a vehicle, the module comprising:

an inflator for generating gas;

an airbag coupled to the inflator and deployable upon generation of gas by the inflator;

a housing made of flexible material, the housing having wall portions surrounding the airbag and inflator, the wall portions defining a housing interior containing the inflator and the airbag substantially therein such that the inflator and the airbag are enclosed within the housing, the housing including a frangible seam being breakable to define a housing deployment opening; and the housing including a chute portion being a continuous extension of the flexible material of the housing and extending beyond the frangible seam, the chute portion having a first end adjacent the frangible seam and an opposite free end;

whereby upon airbag deployment, the airbag breaks open the frangible seam of the housing to permit deployment of the airbag out through the housing deployment opening and the chute portion of the housing such that the housing guides the airbag during deployment.

6. An airbag module of claim 5 wherein the flexible material of the housing is a flexible sheet of plastic material and the frangible seam of the housing is a heat sealed seam.

7. An airbag module of claim 5 wherein the housing is a tear drop shaped housing.

8. An airbag module of claim 6 wherein the housing is a tear drop shaped housing.

9. An airbag module for attachment to a vehicle, the module comprising:

an inflator for generating gas;

an airbag coupled to the inflator and deployable upon generation of gas by the inflator; and a housing for housing the airbag and inflator, the housing being the outermost portion of the airbag module, the housing made of flexible material, the housing having wall portions surrounding the airbag and inflator, the wall portions defining a housing interior containing the inflator and the airbag substantially therein, the housing including a frangible seam being breakable to define a housing deployment opening; whereby upon airbag deployment, the airbag breaks open the frangible seam of the housing to permit deployment of the airbag out through the housing deployment opening such that the housing guides the airbag during deployment.

10. An airbag module of claim 9 wherein the flexible material of the housing is a flexible sheet of plastic material and the frangible seam of the housing is a heat sealed seam.

11. An airbag module of claim 9 wherein the housing is a tear drop shaped housing.

12. An airbag module of claim 10 wherein the housing is a tear drop shaped housing.

* * * * *